No. 663,704. Patented Dec. 11, 1900.
H. J. SCHMICK.
CAM FOR OPERATING MACHINERY.
(Application filed Nov. 22, 1899.)
(No Model.)
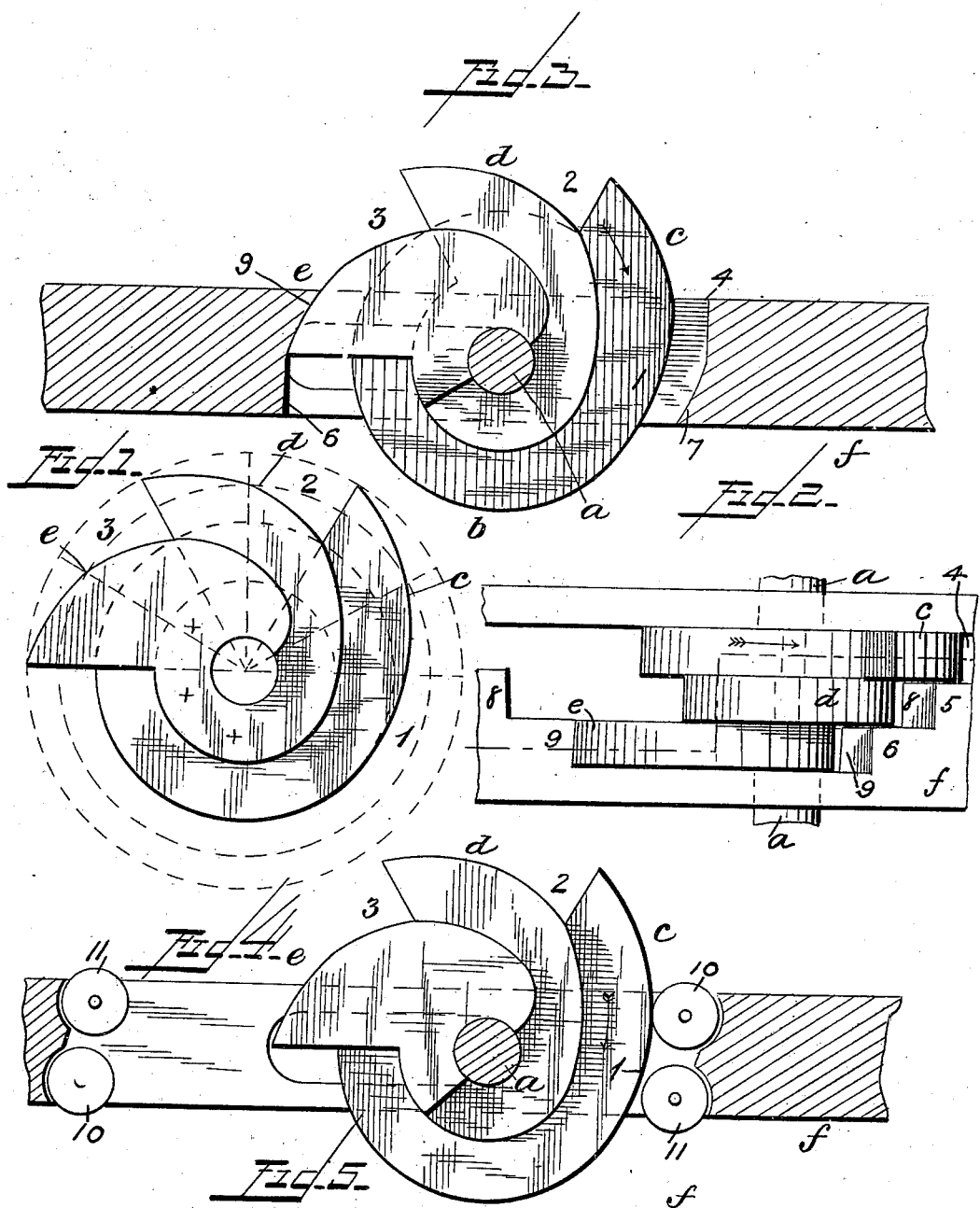

UNITED STATES PATENT OFFICE.

HENRY J. SCHMICK, OF HAMBURG, PENNSYLVANIA.

CAM FOR OPERATING MACHINERY.

SPECIFICATION forming part of Letters Patent No. 663,704, dated December 11, 1900.

Application filed November 22, 1899. Serial No. 737,928. (No model.)

*To all whom it may concern:*

Be it known that I, HENRY J. SCHMICK, a citizen of the United States, residing at Hamburg, in the county of Berks and State of Pennsylvania, have invented certain new and useful Improvements in Cams for Operating Machinery; and I do hereby declare the following to be a full, clear, and exact description of the invention, such as will enable others skilled in the art to which it appertains to make and use the same.

My invention relates to machine elements, has especial reference to cams for operating machinery, and has for its object means including a cam designed to produce a stroke of a moving member in excess of the throw of the cam. In some kinds of work the ordinary cam would have to project an inconveniently long distance from the shaft. To avoid this, I construct my cam of a series of sections in different vertical planes and provide cam-shaped extensions on a movable member with which the sections of the cam engage consecutively to operate the movable member.

The invention consists in certain improvements in construction, which will be fully disclosed in the following specification and claims.

In the accompanying drawings, which form part of this specification, Figure 1 is a diagrammatic view showing the lines from which the several working sections are projected; Fig. 2, a top plan of the cam; Fig. 3, a side elevation, partly in section, showing the cam applied to a movable member to transmit power; Fig. 4, a like view showing a modification of the bearings or faces on the movable member, and Fig. 5 a plan view showing the bearings or faces on the movable member.

Reference being had to the drawings and the designating characters thereon, $a$ indicates a shaft, on which is secured a cam $b$, having three eccentric working sections, designated, respectively, $c$, $d$, and $e$, arranged in different vertical planes and the working surface of each section beginning and ending at points which are in different radial planes from the points in which the working surfaces of the other sections begin and end and are interrupted or set back from the extreme points of the cam at 1, 2, and 3. The movable member $f$ is provided with initial vertical bearings or faces 4, 5, and 6. The throw of the cam as a whole will of course be equal to the distance from the periphery of the shaft to the circumference of the outmost circle in Fig. 1 when the sections 1, 2, and 3 act upon the faces 4, 5, and 6. In order to give a stroke to the movable member $f$ which shall be in excess of this throw of the cam, I form on said movable member projections 7, 8, and 9, adapted to be acted upon by said sections of the cam. It will be noticed that each of these projections is located (with reference to the direction of travel of the cam) beyond a line passing through the center of the shaft and parallel to the direction of movement of the movable member and that when each section reaches the position of section $e$ relative to the movable member in Fig. 3 the corresponding projection will be within the circumference of a circle described from the axis of the shaft as a center and with a radius equal to the distance from said axis to the most remote point of said section. Consequently after the cam has acted upon the faces 4, 5, and 6 of the movable member to move it a distance equal to its throw it will move said member an additional distance equal to the extent of said projections.

It is within the scope of my invention to increase the number of working sections on the cam and the number of faces and projections on the movable member to any degree found to be desirable or advantageous.

In Fig. 4 is shown a modification of the bearings or faces on the movable member $f$, which is made by inserting rollers 10 and 11 in different vertical planes to receive the thrust of the working sections 1, 2, and 3 on the cam and minimize the friction.

In this application I make no claim to the cam *per se*, but only to the cam in combination with a movable member of specific form claimed hereinafter, the cam *per se* being claimed in application Serial No. 8,307, filed March 12, 1900.

Having thus fully described my invention, what I claim is—

1. A cam; in combination with a movable member having a face with which the cam engages throughout its throw, and a projection adjacent to said face with which the cam engages after passing the face, whereby the stroke of the movable member is in excess of the throw of the cam.

2. A cam having a plurality of working sections in different vertical planes and the working surfaces of each section beginning and ending at points which are in different radial planes from the points in which the working surfaces of the other sections begin and end; in combination with a movable member having a plurality of projections in different vertical planes and with which the working surfaces of the sections of the cam engage.

3. A cam having a plurality of working sections in different vertical planes and the working surface of each section beginning and ending at points which are in different radial planes from the points in which the working surfaces of the other sections begin and end; in combination with a movable member having initial faces and projections adjacent thereto with which the working surfaces of the sections of the cam engage, and by which the stroke of the movable member is in excess of the throw of the cam.

4. The combination with a member having cam-shaped bearings, of a cam for moving said member, said cam being composed of a series of elements in parallel planes and the working surfaces of said elements being arranged to act consecutively to gradually advance the member, as set forth.

In testimony whereof I affix my signature in presence of two witnesses.

HENRY J. SCHMICK.

Witnesses:
D. C. REINOHL,
W. PARKER REINOHL.